Dec. 21, 1954 R. B. COLLINS, JR 2,697,805

POINT CONTACT RECTIFIER

Filed Feb. 5, 1949

INVENTOR.
Ralph B. Collins Jr.
BY A. B. Richardson
ATTORNEY

United States Patent Office 2,697,805

Patented Dec. 21, 1954

2,697,805

POINT CONTACT RECTIFIER

Ralph B. Collins, Jr., Everett, Mass., assignor to Sylvania Electric Products, Inc., a corporation of Massachusetts Application February 5, 1949, Serial No. 74,768

7 Claims. (Cl. 317—236)

Figure 1:
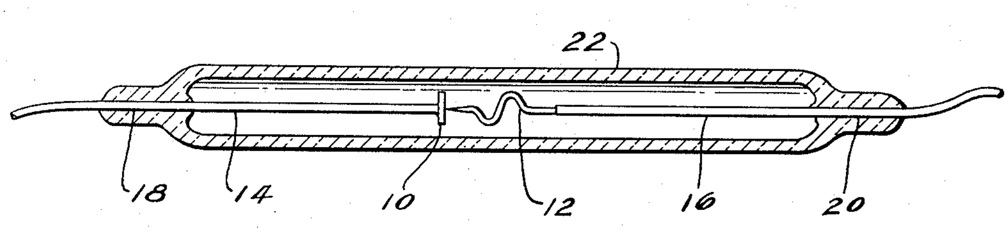

The present invention relates to enclosed electrical devices, and more particularly to point-contact semiconductor devices such as diodes having a whisker in contact with processed germanium or silicon or the like.

Point-contact diodes have been used for many years as detectors in radio circuits and for other purposes, and many diversified constructions have been devised for improved operating characteristics and stability. In early applications, a crystal as of galena was fixedly mounted and a whisker or pointed wire was held under spring tension in contact with the crystal. The arrangement commonly allowed manual readjustment so that new sensitive areas of the crystal could be located by probing the crystal surface.

In many circuit applications, the crystal diode is used in a place that is not accessible for manual adjustment. Even apart from this it is generally considered desirable for crystal diodes to be constructed in such manner that manual adjustment is unnecessary for long periods of use; and the crystal unit should then be so inexpensive as to justify discarding it in the event that readjustment becomes necessary. This type of fixed crystal diode has for long been the subject of intensive development.

A common form of crystal diode of this class has been so costly as to limit its use to circuits requiring its unique properties. One widely used type comprises a threaded ceramic sleeve enclosing the crystal and the whisker which are separately supported on rods fitted snugly and mechanically locked in machined metal bushings screwed to the ends of the ceramic sleeve. In the fabrication of such crystal units, the several expensive components of the cartridge (the bushings and the ceramic sleeve) are assembled and sealed together with a waterproof cement. One of the rods carrying either the crystal or the whisker is then inserted and secured in place by means of a set screw. The other rod is then inserted by an operator guided by electrical equipment continuously testing the diode, and the second rod is finally locked in place. An electrical pulse of predetermined intensity is usually impressed on the diode to improve its characteristics; and this pulse has the further effect of providing mechanical stability because the pointed whisker becomes slightly imbedded in a cavity concurrently formed in the crystal face. In a final effort to guard against atmospheric deterioration of the diode, the ceramic sleeve is filled with a suitable wax or the like. Crystals of this type are discussed extensively in "Crystal Rectifiers" by Torrey and Whitmer, of the Radiation Laboratories' Series, published in 1948 by McGraw-Hill.

The high cost of the foregoing type of crystal can be attributed to the large number of machined parts needed and the numerous assembly steps required. Furthermore the life of the unit is limited by exposure to repeated variations of atmospheric humidity and temperature. In accordance with the present invention, simplified, inexpensive crystal diodes are provided that are of superior resistance to atmospheric deterioration. The nature of the invention will be appreciated from the following detailed disclosure of two illustrative crystals embodying various features of the invention. In the accompanying drawings Figs. 1 and 2 are longitudinal cross-sectional views of two different crystal diodes both embodying certain features of the invention, each embodiment possessing certain additional features.

The present application is a continuation-in-part of my copending application Serial Number 50,637, filed September 22, 1948, now abandoned.

Figure 2:
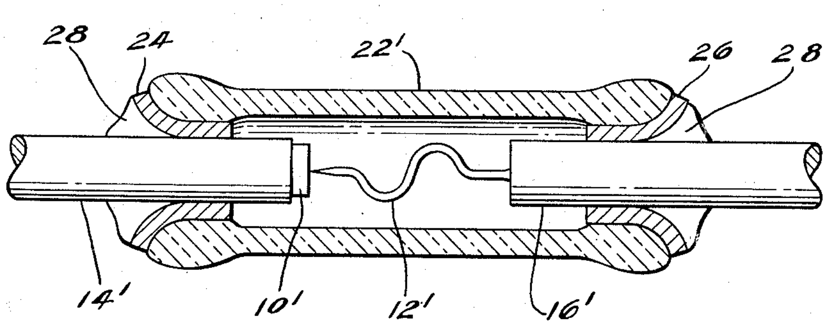

In Fig. 1 a crystal diode is shown employing a wafer 10 of germanium having a trace of tin and processed conventionally to provide a flat surface of optimum electrical properties for the purpose intended. A pointed S-shaped wire as of tungsten is in firm contact with the germanium crystal, the resilience of whisker 12 serving to establish a somewhat critical contact pressure while maintaining contact despite expansions and contractions of the supporting and enclosing structure. A wire 14 is soldered to germanium crystal 10, and another wire 16 is secured as by butt-welding to whisker 12, both wires being sealed at 18 and 20 respectively through long and slender tubular envelope 22 that is of glass or other vitreous insulating material. The portions of wires 14 and 16 that are sealed through the glass envelope are of substantially the same thermal coefficient of expansion as the envelope material. In a preliminary assembling operation, processed crystal 10 is soldered to wire 14 and quickly chilled to prevent deterioration. Cat whisker 12 is electrically welded to wire 16. Then one of these is inserted into a length of glass tubing, and sealed in place by intense localized flames. The second wire is then inserted so as to establish proper contact between the crystal and the whisker, as indicated by test equipment (not shown) connected to wires 14 and 16 externally of the glass tubing; and while the two wires are held firmly in place, the second seal is effected with intense sealing flames to complete the unit. The position and pressure of the point-contact should be critically preserved during and following the final seal, if the test characteristics of the crystal are to be maintained.

The crystal is carefully processed initially by heat-treatment and etching. This conditioning is destroyed by exposure of the crystal to the intensive heating that is normally required for forming a glass-to-metal seal. To limit destructive heating of the crystal during formation of the seal, crystal 10 is supported at a considerable distance from seal 18, and supporting wire 14 is comparatively slender. Whisker 12 is of fine resilient tungsten wire, and is also susceptible to damage upon exposure to high temperatures. For this reason whisker 12 is supported far from seal 20 on wire 16 that is comparatively slender.

The sealing flame tends to heat the entire glass envelope to some extent, and raises the temperature of the air enclosed by the glass tube before the second seal is completed. This heating tends to drive moisture adsorbed on the surface of the glass into the enclosed air, and the heat and expansion drive some of the air out of the tube. After the second seal is complete, much of the moisture in the confined air is again captured on the surface of the glass. The humidity of the enclosed air is reduced, and the air pressure is relatively low.

The crystal is electrically pulsed after the sealing operation. The electrical characteristics of the unit remain comparatively stable, despite normal changes in ambient temperature. The unit is hermetically sealed against effects of atmospheric humidity.

The diode of Fig. 1 requires tubing from which the envelope is made to be of sufficiently large bore to admit both the crystal 10, and the sinuous cat whisker 12 as well, before the seal is made. Due to the extensive overall length of the tube, a relatively large volume of air is enclosed which thus potentially is a threat to the condition of the carefully processed crystal. The length and thinness of wires 14 and 16, required for isolation of the crystal and whisker from sealing heat, produces some tendency of the crystal and whisker to vibrate destructively when subjected to shock. The whisker might be shifted away from the position on the crystal where it was pulsed. The comparatively great length of wires 14 and 16 between the crystal and whisker and the respective external terminals is a deterrent to use of crystals of this design in the microwave regions. However, the simplicity of design and consequent low cost favor this form of glass-enclosed crystal where very high frequencies need not be considered and mechanical shock is not expected.

In Fig. 2 a second form of crystal diode is shown employing a vitreous envelope that constitutes a feature of the present invention. Crystal 10' and whisker 12' are carried by rods 14' and 16' respectively, the crystal and whisker being enclosed in tube 22' of glass or similar vitreous material. Sleeves 24 and 26 are sealed hermetically to the glass, to form a cartridge with accurately dimensioned end portions, the sleeves providing tight bores for rods 14′ and 16′ that are preferably coaxial. The rods are relatively adjusted for proper contact between the crystal and whisker as indicated by test equipment (not shown) connected during the final assembly step to rods 14′ and 16′. A waterproof cement 28 or low-temperature solder is then applied to join the rods and sleeves. If a waterproof cement is used, the fit of the rods in sleeves 24 and 26 should be particularly snug and mechanically rigid. The cement should be relied on primarily for the hermetic seal afforded, and not for mechanical strength and stability.

Assembly of the crystal starts with preparation of three separate units. A processed piece of germanium or the like is soldered to one end of rod 14′ and quickly chilled, the germanium being small enough to pass through the bore of sleeve 24. A whisker of fine tungsten wire (of the order of .005 inch diameter) appropriately pointed is butt-welded to rod 16′. Glass portion 22′ of the enclosing cartridge is heat-sealed to sleeves or eyelets 24 and 26 of a metal that has very nearly the same thermal coefficient of expansion as the glass or comparable material. Various alloys suitable for sealing to different types of glass are generally available. In the final operations, one of the rods 14′ or 16′ is pushed into one of the sleeves 24, 26 and then the other is pressed into the other sleeve, under guidance of connected test equipment. Glyptal or like cement is applied at 28 for completing the hermetic enclosure of the crystal and whisker. In this way the enclosure is prevented from "breathing" during cycles of varying temperature and humidity. The entrapped air contains a certain amount of moisture which tends to become adsorbed to the inside surface of the glass and is thus prevented from attacking crystal 10′. Air cyclically brought in and expelled in prior-art constructions would carry with it additional deleterious humidity and other substances, but it has been found that it is not necessary to exhaust the sealed unit.

The short length of the assembled unit in Fig. 2 as compared to that in Fig. 1 is of particular advantage in electrical circuits where short conductors of low reactance are required. The relative shortness and stiffness of supporting rods 14′ and 16′ additionally provide mechanical stability. Whisker 12′ itself has its point somewhat imbedded in the surface of crystal 10′ by the pulsing treatment, and because of its thin gauge it has very little mechanical inertia and very little tendency toward such mechanical resonance as might disturb its contact with crystal 10′ even when exposed to moderate shock.

Hermetic seal 28 may be of solder, rather than of Glyptal or other waterproof and airtight cement. In that event, the solder should be fused in place very quickly using quick localized application of heat, and an effective flux should be used, in order that the heating may be quickly interrupted, and the soldering temperature dissipated by distribution of the heat in the rods. The use of solder enhances the mechanical properties of the assembly, yet it does not involve the high temperatures required in the fused glass-to-metal seals of sleeves 24 and 26. The hermetic enclosure formed by the insulating tube of glass, the direct seal of the glass to the metal sleeves, and the sealed joints between the rods and the sleeves, provides an effective protection against atmospheric attack, and the several components are of simple inexpensive design and are susceptible of assembly without exposing the crystal and cat whisker to destructive temperatures.

The forms of crystal diode in Figs. 1 and 2 embody the additional features of permanent rigidity and transparency of the wall. These are important to crystal performance and manufacture. Any tendency of the capsule or cartridge to warp would disturb the relationship between the rods that separately support the crystal and whisker, such as might disturb the contact. The enevelope transparency is of special importance in the manufacture of reliable crystals. If an inserted whisker is not almost perfectly perpendicular to the flat, hard crystal face, it tends to slip or "skate" away from the initial position; and imperfect whisker alignment can be visually detected during assembly when it can be corrected, and after completion when the unit can be rejected to insure reliability of the product.

Various modifications of the foregoing forms of crystal assemblies will be readily apparent. A very excellent unit can be made in which the crystal is inserted and supported according to Fig. 2 while the whisker is supported on a wire directly sealed through the vitreous tube as in Fig. 1. Other applications of the several features of the invention will occur to those skilled in the art; and therefore the appended claims should be allowed such broad interpretation as is consistent with the spirit and scope of the invention.

What is claimed is:

1. An electrical device comprising a crystal, a whisker, a cartridge comprising an annular vitreous insulator and metallic sleeves having fused seals to said vitreous insulator at opposite ends thereof, and metal rods hermetically sealed through said sleeves and separately supporting said crystal and whisker in critical mutual contact and effectively enclosed against atmospheric attack.

2. A crystal diode comprising a semi-conductive crystal, a resilient pointed wire, a cartridge enclosing said crystal and said wire, said cartridge comprising a vitreous tube and a pair of sleeves having fused joints to said tube, conductive rods of greater diameter than the largest transverse dimension of said crystal and of said wire sealed through said sleeves and supporting said crystal and wire in critical mutual contact.

3. An electrical unit comprising a glass envelope, a cat whisker and a crystal hermetically enclosed within said envelope, electrical connectors penetrating said envelope through hermetic seals, one of said seals comprising a sleeve fused to said envelope and sealed to and penerated by one of said conductors, said cat whisker and said crystal being separately supported by said conductors in critical mutual contact.

4. An electrical device including a semiconductive crystal, a whisker and a cartridge enclosing said crystal and whisker, said cartridge having a metallic sleeve at each of the opposite ends thereof and having a hollow vitreous wall having fused hermetic seals directly to said sleeves, and a pair of rods extending through and hermetically sealed to said sleeves respectively and separately supporting said crystal and whisker in critical mutual contact.

5. An electrical device in accordance with claim 7 wherein said vitreous wall has a fused joint to only the outer lateral surfaces of said sleeves.

6. An electrical point-contact reactifier device comprising a crystal and a cat whisker enclosed in a hermetically sealed container, the container comprising a tubular vitreous envelope, metal sleeves sealed directly by fusion into the ends of the tubular envelope and having portions which extend outwardly with respect to a longitudinal axis of the envelope and which abut the extreme ends of the envelope, and conducting rods for supporting the cat whisker and the crystal in fixed, mutual contact, the rods extending through the sleeves and being sealed thereto.

7. A crystal detector including a crystal, a cat whisker in contact therewith, a vitreous envelope enclosing said crystal and cat whisker, and a pair of stiff conductors extending through metal-to-glass fused seals and into the envelope and supporting said crystal and cat whisker in fixed pressure contact, at least one of said seals including a metallic sleeve heat fused to the glass to embody a hermetic seal and a conductor passing through the sleeve and hermetically sealed therein.

References Cited in the file of this patent

UNITED STATES PATENTS

| Number | Name | Date |
|---|---|---|
| 756,676 | Midgley | Apr. 5, 1904 |
| 817,664 | Plecher | Apr. 10, 1906 |
| 1,537,856 | Michels et al. | May 12, 1925 |
| 1,782,129 | Andre | Nov. 18, 1930 |
| 1,792,781 | Thilo | Feb. 17, 1931 |
| 2,154,542 | Swanson | Apr. 18, 1939 |
| 2,265,821 | Siegel | Dec. 9, 1941 |
| 2,414,137 | Branson | Jan. 14, 1947 |
| 2,419,561 | Jones et al. | Apr. 29, 1947 |
| 2,475,940 | Brittain | July 12, 1949 |
| 2,572,993 | Douglas et al. | Oct. 30, 1951 |
| 2,603,692 | Scaff et al. | July 15, 1952 |
| 2,626,985 | Gates | Jan. 27, 1953 |

FOREIGN PATENTS

| Number | Country | Date |
|---|---|---|
| 251,706 | Great Britain | May 11, 1926 |
| 616,065 | Great Britain | Jan. 17, 1949 |